GERALD C. SUMMERS
INVENTOR.

BY D. Carl Richards
AGENT

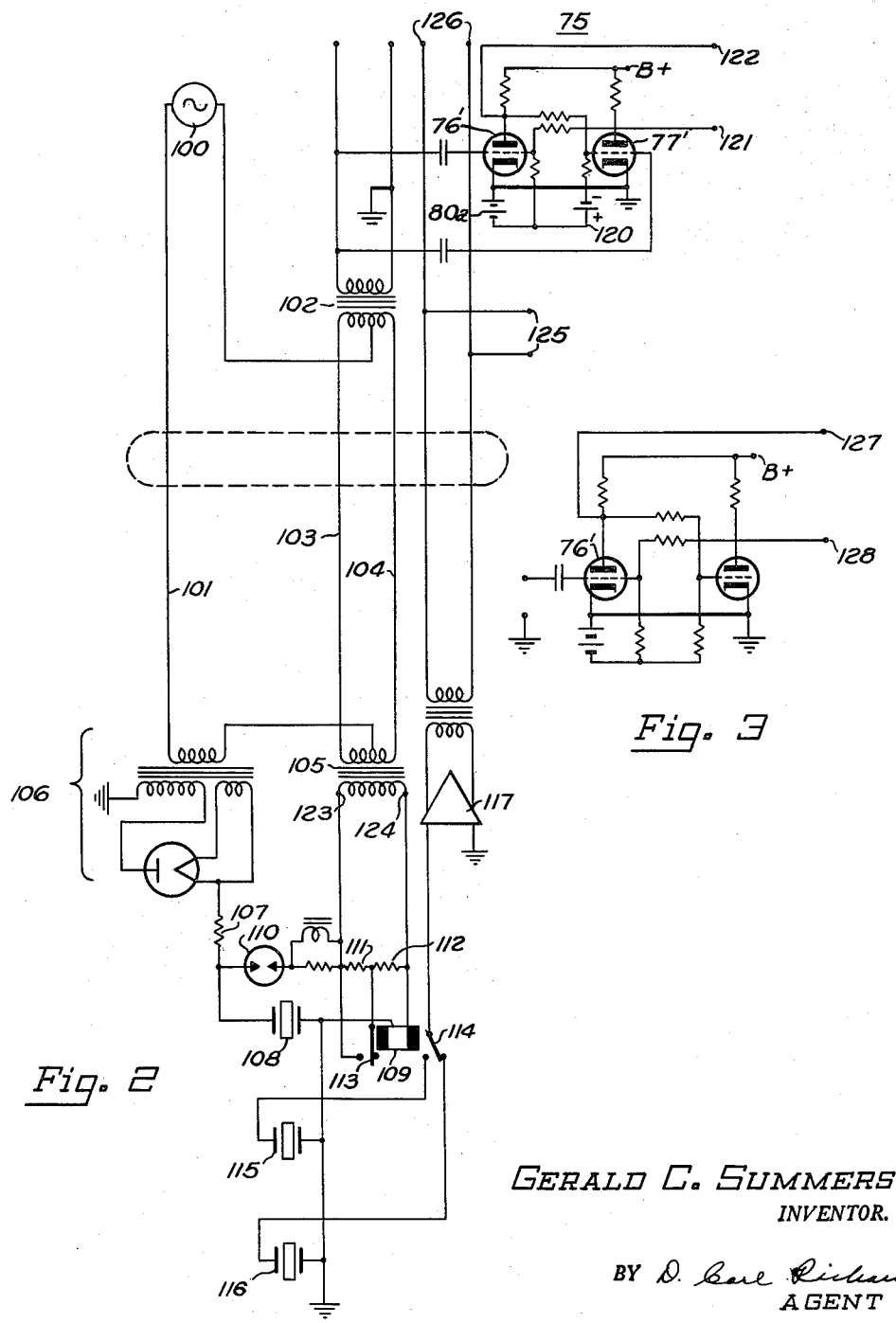

GERALD C. SUMMERS
INVENTOR.
BY

United States Patent Office 3,191,145
Patented June 22, 1965

3,191,145
BORE HOLE TRANSMISSION IN WELL
LOGGING SYSTEMS
Gerald C. Summers, Dallas, Tex., assignor, by mesne
assignments, to Socony Mobil Oil Company, Inc., a
corporation of New York
Filed May 15, 1952, Ser. No. 287,853
15 Claims. (Cl. 340—18)

This invention relates to well logging and more particularly to the production and transmission of more than one set of bore hole data without objectionable crossfeed effects. The invention has been found to be particularly applicable to acoustic well logging and for the purpose of illustration reference will be made to such systems.

For example, knowledge of acoustic velocity of formations is important from the standpoint of both exploration for and production from petroleum reservoirs. In applicant's co-pending application for Velocity Well Logging, S.N. 192,750, filed October 28, 1950, now Patent No. 2,704,364, which issued March 15, 1955, there is disclosed a system in which an output voltage is produced dependent upon the travel time of an acoustic pulse between a transmitter and a receiver spaced a predetermined distance apart and movable one with the other in their predetermined spaced relation throughout the length of a bore hole. In accordance with the aforesaid application there is produced a single log or curve of velocity versus depth. In accordance with the present invention a plurality of traces are produced, or in the alternative a single trace is produced utilizing two independent sets of velocity data giving more detailed and reliable information relating to the formations along the bore hole. In the interest of accuracy in velocity measurements, sharp discrete energy pulses are used. Transmission of such pulses over the length of extremely long cables used to extend to the bottom of deep bore holes presents a problem of isolation or separation of the signals. Where arrival times of pulses at the surface and the timing and detection thereof are critical, crossfeed difficulties as between adjacent cable channels may render entirely inoperative systems attempting to utilize separate channels.

A similar problem exists in systems responsive to variations in the attenuation properties of formations. In copending application for Selective Pulse Acoustic Well Logging, S.N. 197,074, filed November 22, 1950, now Patent No. 2,691,422, which issued Oct. 12, 1954, a system is disclosed for producing a single output voltage proportional to the energy transmitted between two points over a selected formation path. In accordance with the present invention, two output voltages may be produced and utilized for more accurately defining the attenuation properties of the formation.

In accordance with the present invention pulses spaced in time are transmitted over the same channel for avoidance of signal crossfeed with suitable coding means for proper separation of the time-spaced signals at the earth's surface. Thus the difficulties generally encountered are completely eliminated permitting the utilization of two independent sets of data transmitted over a single channel. While, in general, multiple transmission is not new, limitations on bore hole instrumentation and the desirability of simplicity in downhole components present problems not ordinarily present in multiplexing problems.

By the present invention there is provided a bore hole sensing system which comprises means for periodically generating a transient condition in formations adjacent to the bore hole with detectors separated one from another at points spaced from the generating means. A signal channel extending along the bore hole is alternately connected first to one and then to the other of the detectors in response to generation of each cycle of the transient condition for transmission of time separated signals dependent upon the condition detected at two points in the bore hole. A time marker is transmitted through the bore hole having a predetermined time relation to the generation of each cycle of the condition with means for distinctively characterizing the timing marker when the first of the detectors is connected to the signal channel different from the marker when the second of the detectors is connected to the signal channel.

In a further aspect of the invention two sensing units at the earth's surface are coupled to the transmission channel for reception of the time separated signals and are controlled by means responsive to the timing marker for coupling first one and then the other of the sensing means on alternate cycles of the condition to the signal channel for producing two outputs respectively representative of the condition at two points in the well bore. Means responsive to the outputs of the sensing means may be utilized to produce one or more distinctive logs.

Further, applicant produces a first log depending upon the travel time of an acoustic pulse over a relatively long path or a log of one of the aforementioned outputs; and also produces a second log, the difference between the aforementioned outputs, to present a more detailed velocity picture of the formations.

For further objects of the present invention and for a more complete understanding thereof reference may now be had to the following description taken in conjunction with the accompanying drawings in which:

FIG. 2 is a modification of the invention;

FIG. 3 is a modified form of the multivibrator circuit for utilizing distinctive time markers.

Figure 1:
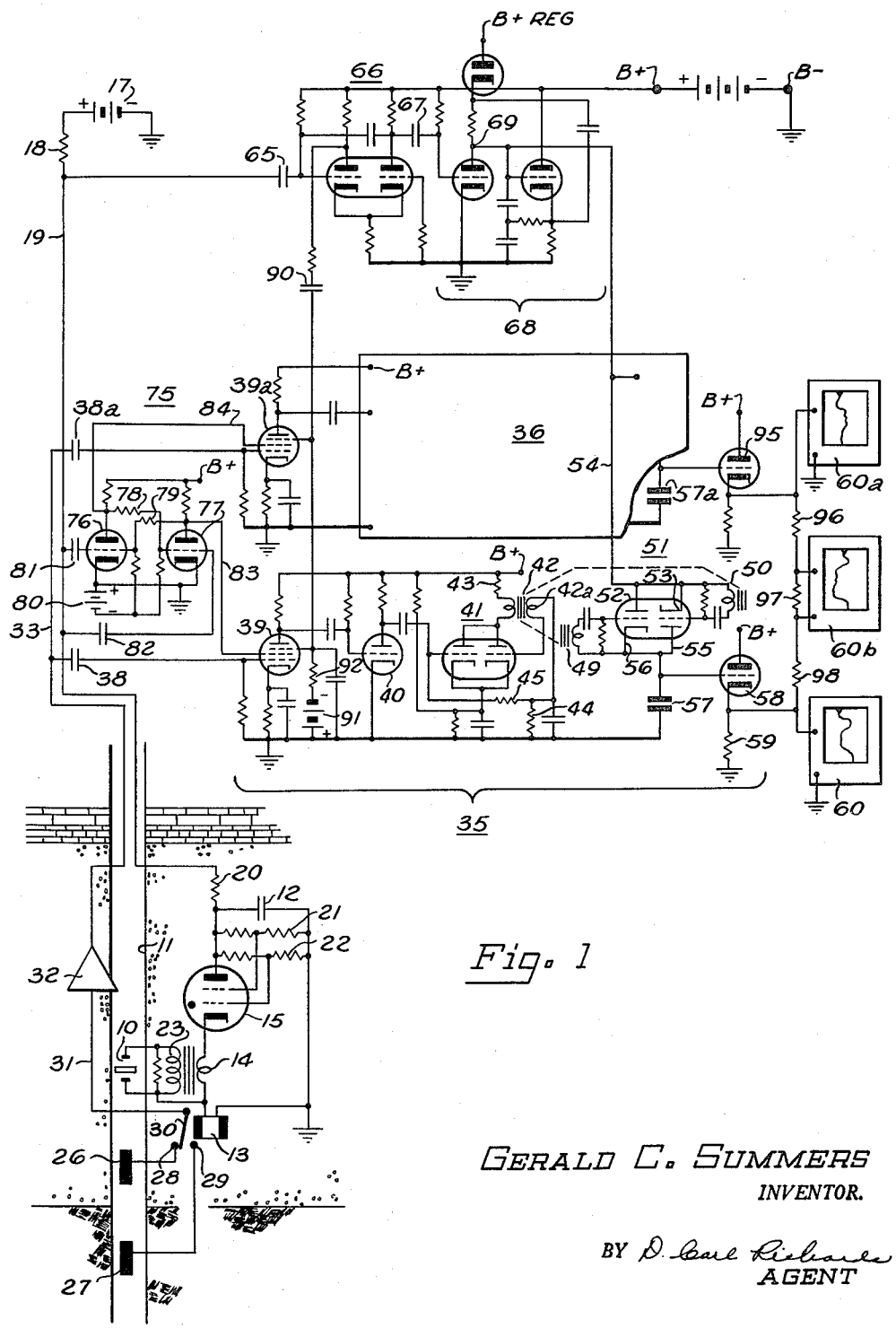
FIG. 1 is a schematic circuit diagram of one form of the present invention.

Referring now to FIG. 1, an acoustic velocity well logging system is illustrated in which an acoustic pulse transducer means, including a crystal element 10, is located at depth in a bore hole 11. In the interest of clarity, the housing and supporting means for the elements operating in bore hole 11 have been omitted though the circuit has been illustrated in detail at points representative of their operative positions in the bore hole. The crystal 10 is excited by way of an electrical pulse produced upon discharge of a condenser 12. Condenser 12 is connected in series with a relay coil 13, a primary winding 14 of a pulse transformer and the cathode-anode impedance of a gas discharge tube 15 which, with crystal 10, comprise a pulse producing transducer means. Condenser 12 may be charged from a direct current source 17 positioned at the surface of the earth and having its negative terminal connected to ground. The positive terminal is connected by way of resistance 18, cable conductor 19 and resistance 20 to condenser 12 and to the anode of tube 15. Tube 15 of the tetrode type has its grids connected to points of positive potential on the voltage dividing resistors 21 and 22.

The voltage on the condenser 12 builds up gradually as current flows through resistors 18 and 20 until the voltage across it is sufficient to fire tube 15. Condenser 12 abruptly discharges through tube 15 producing a pulse in the primary 14 of the pulse transformer. The secondary 23 of the pulse transformer is connected directly to the terminals of the crystal 10. The crystal 10, suitably supported in the bore hole, produces pressure variations in the adjacent formations.

The resultant acoustic pulse from the free running transducer means is detected at two points spaced one from another and from the crystal 10. More particularly detectors 26 and 27, supported in fixed relation to crystal 10, are positioned in the bore hole and are connected to terminals 28 and 29 of an output circuit selector which, in the form illustrated, is a relay mechanism actuated by energization of coil 13. The armature 30 of the relay is connected by way of coductor 31 to a bore hole amplifier 32 whose output in turn is connected to the signal channel 33 extending from within the bore hole to the earth's surface.

Relay operation is such that armature 30 is restrained (by means not shown) in contact with terminal 28 until energization of coil 13. Thereupon armature 30 is moved into contact with terminal 29 and is there restrained until a subsequent energization of coil 13. Stepping switches operating in this manner are commercially available.

The relay first connects detector 26 to amplifier 32 for a first cycle of the pulse generated by crystal 10 and then on the next cycle connects detector 27 to amplifier 32. On the following cycle detector 26 is again connected to the amplifier 32. Thus the signal channel 33 carries signals on successive cycles that are dependent upon the acoustic pulse as detected at two different points. The relay coil 13, energized upon each discharge of condenser 12, provides a simple but reliable means for separating the effects produced by the two detectors since the switching takes place before arrival of the acoustic pulse at either of the detectors.

In order to utilize the alternate signals appearing on the signal channel 33 there is provided at the earth's surface a pair of sensing systems 35 and 36. The sensing systems 35 and 36 are substantially identical in construction and for that reason only one has been shown in detail. Where differences are necessary for utilization of the time separated signals appearing on channel 33 such differences have been shown.

Consider first the sensing system 35. The construction and operation of this sensing system have been described in detail in the aforementioned co-pending application S.N. 192,750. Briefly, however, the signals appearing on channel 33 are applied by way of condenser 38 to the input grid of a pentode amplifier 39. The output of amplifier 39 is applied to tube 40 whose output in turn actuates a blocking oscillator 41. The blocking oscillator 41 comprises a pair of triode sections parallel connected at both cathode and anode with the signal from tube 40 applied to the grid of one of the sections. The anodes are connected through the primary of a pulse transformer 42 and a reistor 43 to a source of anode potential. A first secondary 42a of the transformer 42 is connected to the grid of the second of the triode sections and by way of resistor-condenser combination 44 to ground. When a voltage train having an abrupt onset is applied to the input grid of the blocking oscillator 41, a single pulse is generated in the output which produces a voltage in the RC network 44. This voltage, coupled by way of resistor 45 to the input grid, blocks the circuit for a period depending upon the time constant of the network 44. As a result, a single pulse is produced coincident with the onset of the voltage train.

The pulse output of the blocking oscillator 41 also appears in a second secondary winding 49 and a third secondary winding 50. For convenience in illustrating the circuit, the dotted lines have been placed between the cores associated with windings 42a, 49 and 50 and are to be taken as indicating a common magnetic core.

The secondary windings 49 and 50 are connected in and serve to actuate a normally closed electronic switch 51. The electronic switch 51 includes a pair of triodes connected as to permit conduction bilaterally. More particularly, anode 52 is connected to cathode 53 and also to a conductor 54 connected to a time varying source voltage, the nature of which will hereinafter be described. Anode 55 is connected to cathode 56 and also to one terminal of a condenser 57. The other terminal of condenser 57 is connected to ground. Condenser 57, by the momentary energization of the transformer secondaries 49 and 50 which opens the normally closed switch 51, is charged to a voltage equal to the voltage appearing on conductor 54. The voltage on condenser 57 is then sensed by a cathode follower output stage 58.

The voltage across the cathode resister 59 may be utilized to actuate a suitable recorder 60 to produce a record trace which varies in proportion to the voltage across condenser 57.

The voltage on conductor 54 preferably varies monotonically and linearly in time beginning at zero coincident with the generation of each acoustic pulse by the crystal 10 so that the voltage across the condenser will be maintained at all times directly proportional to the time required for an acoustic pulse to travel from crystal 10 to one of the two associated detectors. When the condenser 12 discharges through tube 15, a voltage pulse appears on the bore hole conductor 19. This pulse is applied by way of condenser 65 to the input grid of a monostable multivibrator 66. The pulse output of the monstable multivibrator 66 is transmitted through condenser 67 to a voltage generator 68. The voltage generator 68 together with its controlling multivibrator 66 is of the type well known in the art and is illustrated and described in detail in Wave Forms, vol. 19, of the M.I.T. Radiation Laboratory Series, McGraw-Hill, 1949, at section 5.5, page 166. The operation is such that the voltage at point 69 is initially zero and rises monotonically and linearly as a function of time thereafter. This voltage applied by way of conductor 54 and through the switch 51, when opened by the pulses coincident with transmission of a signal through amplifiers 39 and 40, charges the condenser 57. The voltage on condenser 57 is thus proportional to the time interval between generation of the pulse by crystal 10 and the arrival at detectors 26 and 27 of the acoustic pulse.

In operation of the system of FIG. 1 the sensing means 35 is responsive only to pulses from detector 26 *or* only to pulses from detector 27. Similarly, for any one period of operation or for any one logging run the sensing system 36 is responsive only to detector 27 *or* to detector 26. By this means there will be produced across condenser 57 a voltage dependent upon the travel time of a pulse from crystal 10 to, for example, detector 26. There will also be produced across condenser 57a at the output of sensing system 36 a voltage dependent upon the travel time of an acoustic pulse from crystal 10 to detector 27.

Uncertainty as to which detector energizes which sensing system is permitted in FIG. 1 as further explained below. More particularly, no means is provided to make certain that detector 26 will actuate sensing system 35 for every series of operations. Just which sensing system the individual detectors actuate will depend upon the condition of the control circuit 75 at the beginning of each logging run or each series of operations. In this form of the invention no attempt is made to control the initial condition, the latter being random, but nevertheless the voltages on condensers 57 and 57a are properly utilizable for the production of bore hole logs regardless of the random nature of initial channel selection.

More particularly, the control circuit 75 is a bi-stable multivibrator and includes tubes 76 and 77. The anodes are connected through suitable load resistors to a source of anode potential (B+). The cathodes are connected directly to ground. The control grids are conventionally cross-connected to the anodes by way of resistors 78 and 79. The grids are also connected through bias battery 80 to ground. The timing marker on bore hole conductor 19 is applied to both grids by way of condensers 81 and 82. The anode of tube 77 is connected by way of conductor 83 to the screen grid of amplifier 39. The anode of tube 76 is connected by way of conductor 84 to the screen grid of tube 39a which is the input amplifying pentode of the sensing unit 36.

When tube 77 is conducting, the voltage at its anode is relatively low with respect to ground, and thus the screen voltage on tube 39 is relatively low so that there will be no conduction therethrough. Tube 39 is thus effectively blocked when tube 77 is conducting. At the same time the anode of tube 76 is relatively high so that tube 39a is conducting and thus passes signals applied to its control grid from channel 33 by way of condenser 38a.

In order to illustrate operation of this system, assume tube 76 is initially non-conducting and tube 77 initially conducting. The following conditions or actions take place in substantially the following order:

(1) A sonic pulse is generated by crystal 10.

(2) Relay coil 13 is energized to move armature 30 to terminal 29 connecting detector 27 to the amplifier 32.

(3) A timing marker appearing on conductor 19 actuates monostable multivibrator 66 and voltage generator 68 to initiate generation of a linearly rising voltage at point 69.

(4) The timing marker is applied to the grids of both tubes 76 and 77 through condensers 81 and 82, respectively. If it is a positive pulse, it initiates conduction in tube 76 which simultaneously stops conduction in tube 77. If a negative pulse, it is effective on the grid of tube 77 to extinguish tube 77 and to initiate conduction in tube 76. As a result, tube 39a is rendered non-conductive and tube 39 is rendered conductive.

(5) Detector 27 produces an electrical pulse in response to the received sound pulse which is transmitted to the surface of channel 33 and thence through condenser 38 to the sensing unit 35.

(6) The blocking oscillator 41 momentarily opens, that is, renders conductive, switch 51 coincident with and responsive to the electrical pulse from condenser 38 thereby to charge condenser 57 to the voltage at that instant appearing between point 69 and ground. Switch 51 is immediately closed, that is, rendered non-conductive, so that the charge on and thus the voltage across condenser 57 remains constant until switch 51 is again opened.

(7) Condenser 12, having accumulated a charge and thus a voltage sufficient to cause breakdown of tube 15, again discharges generating a second sonic pulse at crystal 10.

(8) Relay coil 13 is energized to move armature 30 to terminal 28 connecting detector 26 to amplifier 32.

(9) A timing marker generated coincident with discharge of condenser 12 initiates another cycle of generation of a linearly varying voltage at point 69, the monostable multivibrator 66 and the circuit 68 having reset themselves automatically in dependence upon their own time constants.

(10) The timing markers applied to tubes 76 and 77 extinguish tube 76 and initiate conduction in tube 77, thus rendering tube 39a conductive and tube 39 non-conductive.

(11) Detector 26 generates an electrical voltage coincident with the arrival of the acoustic pulse which is amplified by amplifier 32 and transmitted uphole over conductor 33. This pulse is applied through condenser 38a to amplifier tube 39a and thence through the sensing unit 36 to charge condenser 57a to a voltage proportional to the time of travel of the acoustic pulse between crystal 10 and detector 26.

Thereafter the foregoing steps are repeated cyclically so that detectors 26 and 27 alternately are connected to amplifier 32 and channel 33, and sensing systems 35 and 36 are synchronously and alternately rendered conductive by the signals thus generated.

Incidentally, and as explained in detail in the above mentioned Patent 2,704,364, a voltage from the monostable multivibrator 66 is connected by way of resistor-condenser combination 90 to the suppressor grids of both tubes 39 and 39a. This voltage, operating in conjunction with the battery 91 and its associated resistor and condenser circuit 92, renders non-conductive tubes 39 and 39a simultaneously with the transmission of the timing marker to prevent the timing marker itself from energizing the switch 51 and the corresponding switch in the sensing unit 36. The voltage on the suppressors of tubes 39 and 39a thereafter gradually rises so that in so far as the suppressor grid is concerned both tubes 39 and 39a may conduct shortly after appearance of the timing marker pulse.

It will now be apparent that two output voltages are produced (i.e., across condensers 57 and 57a). They may be utilized to produce any or all of three useful velocity type logs. Recorder 60 records as a first log the voltage across condenser 57. The voltage across condenser 57a through cathode follower stage 95 is applied to a recorder 60a to produce a second log. Additionally, the cathode of tube 95 is connected by way of resistors 96, 97 and 98 to the cathode of tube 58. Any differences in voltage across condensers 57 and 57a will thus appear, in a predetermined scaled relation which depends on the magnitudes of resistors 96–98, across the central resistor 97. A third recorder 60b is connected as to record as a third log the voltage across resistor 97.

Thus regardless of the initial condition of the control unit 75, recorder 60b will indicate in reliable relationship the differences in magnitude between the voltage of condensers 57 and 57a. Since one detector in general is positioned closer to the source 10 than the other detector, the larger of two voltages as indicated by the amplitudes of traces on recorders 60 and 60a will indicate which channel is sensing the near detector or the far detector.

This system may be utilized to particular advantage by recording two functions only, a first of which is a voltage proportional to the travel time over a long path (the path between crystal 10 and the far detector 27). This will give a relatively accurate measure of the velocity. For a detailed velocity study, detector 26 may be positioned closely adjacent detector 27, and the difference in the pulse travel times for the two distances, as recorded by recorder 60b, will indicate velocity detail far beyond the perception of conventional velocity logging systems.

The signals for providing such data are transmitted to the earth's surface without the possibility of crossfeed, the separation of signals being provided by relatively simple selector means in the bore hole requiring no components other than the relay itself. If attempts are made to utilize separate channels without the signal selective network such as is here provided for the surface units, crossfeed will render the system inoperative. Transmission of such signals over 6,000 to 10,000 feet of cable, with cables of the type available in the industry, often has crossfeed signals of magnitudes in the order of 33 percent or more, depending of course upon the frequency spectrum of the signals transmitted. Such objectionable features are thus overcome, permitting use of conventional well logging cables.

A modified system is illustrated in FIG. 2. An alternating current source 100 is connected by way of conductor 101 and through transformer 102, conductors 103 and 104 and transformer 105 to a rectifier 106 positioned in the bore hole. Rectifier 106 is connected through resistor 107 to the acoustic signal source or crystal 108 which in turn is connected to ground. When the charge on the crystal reaches a certain magnitude, discharge tube 110 breaks down to discharge crystal 108. The discharge current flowing through resistors 111 and 112 and the relay coil 109 actuates the stepping switch armatures 113 and 114. Armature 114 serves alternately to connect detectors 115 and 116 to the bore hole amplifier 117 in the same manner as above described in connection with FIG. 1. On alternate discharges of crystal 108 armature 113 shunts resistor 111. If resistors 111 and 112 are of equal value, the timing marker applied to transformer 105 and transmitted uphole to transformer 102 will alternately be of different amplitudes, bearing a relation one to another of one to one-half.

The control system 75', corresponding with control system 75 of FIG. 1, is responsive to such distinctive markers so that tubes 76′ and 77′ no longer operate from an initial random condition but rather are keyed to and synchronized with the relay 109. More particularly, a battery 120 is connected in the grid circuit of tube 77′ and its level adjusted together with the level of battery 80a so that it will not respond to timing markers of one-half amplitude.

The output voltages from the control network 75′ appearing at terminals 121 and 122 will thus be applied to sensing systems of the type above discussed which will be connected to terminals 125 and 126. Thus regardless of the tendency of tubes 76′ and 77′ to lock into operation at random, the circuit operation at least after the first pulse from crystal 108 is keyed to relay 109.

FIG. 3 illustrates an alternative arrangement. The timing markers may be characterized by reversal in polarity on alternate cycles rather than the variation in amplitude discussed above. This may be accomplished by reversing the circuit connections at terminals 123 and 124 of the transformer 105, FIG. 2, under the control of relay 109. A double throw, double pole switch operated by a relay coil would be suitable. When markers of reversing polarity are utilized, the markers are applied only to the grid of tube 76′, FIG. 3, since the positive pulse will turn tube 76′ on and the negative pulse will turn tube 76′ off. In this manner, output voltages at terminals 127 and 128 are in a different manner keyed to switching operation downhole.

Figure 4:
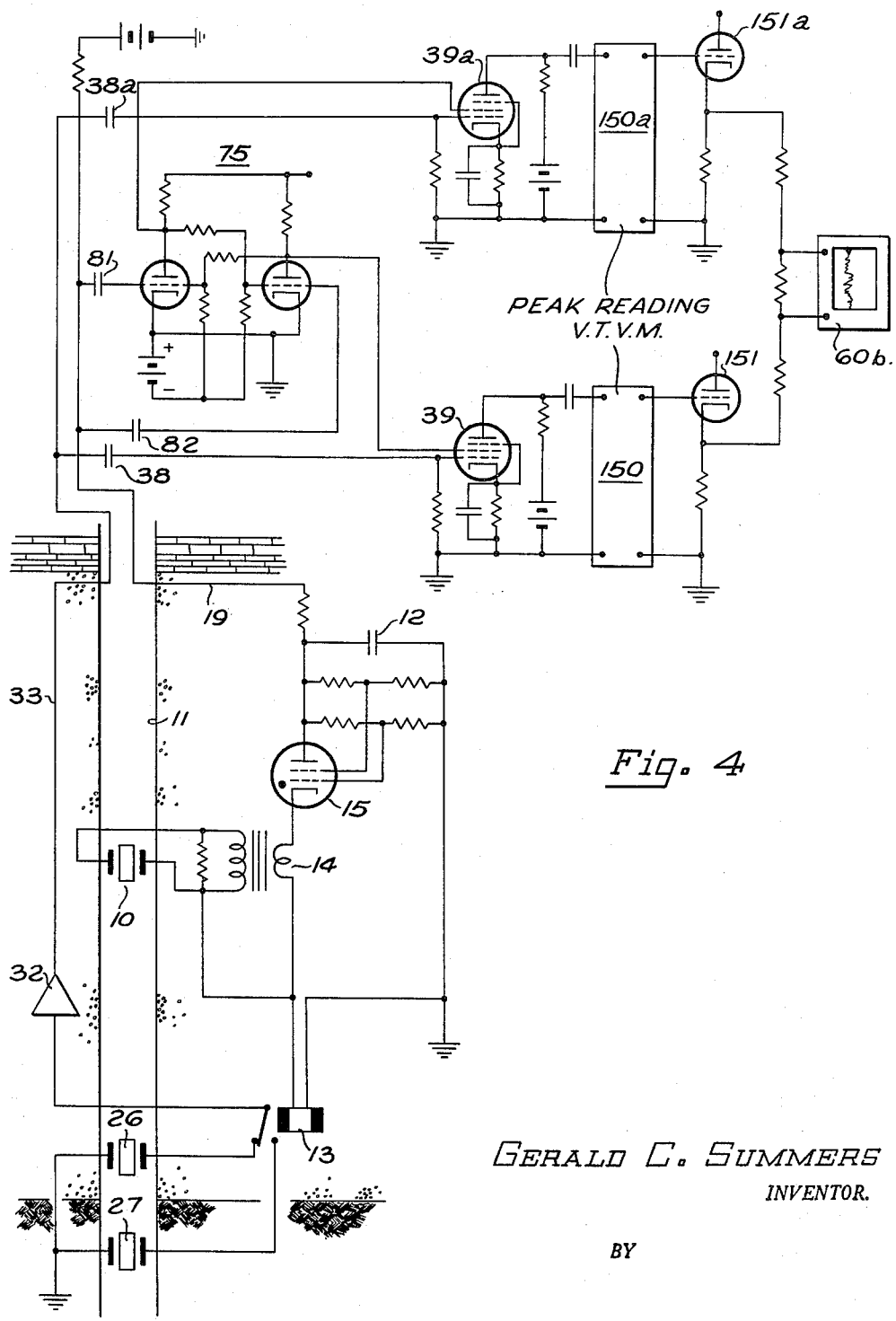
FIG. 4 illustrates a modification of the invention.

The foregoing description has related specifically to acoustic velocity well logging systems. Now, there will be described a system in which the attenuation properties of the earth formations are measured. In accordance with the embodiment of the invention illustrated in FIG. 4, two output voltages are provided for more accurately indicating the attenuation properties than is possible with prior art systems. Where consistent, like parts have been given the same reference characters as in FIG. 1.

The separation between the transducer 10 and the detectors 26 and 27 is made relatively large compared to the spacing between detectors 26 and 27. Condenser 12 discharging through relay coil 13, transformer primary 14 and tube 15 produces acoustic pulses in the formations adjacent the bore hole 11 for travel to the detectors. In response to repeated cycles of discharge of condenser 12, detectors 26 and 27 are connected on alternate cycles to the input of amplifier 32. Signals are transmited uphole by way of channel 33 and are applied through condensers 38 and 38a to the control grids of amplifying tubes 39 and 39a. A marker pulse, generated coincident with generation of each of the pulses by the transducer 10, is transmitted uphole by way of conductor 19 and applied by way of condensers 81 and 82 to the bi-stable multivibrator 75. Multivibrator 75 serves to produce gating voltages for application to the screen grids of the amplifier tubes 39 and 39a. The output of amplifier 39 is connected to a peak reading vacuum tube voltmeter 150. The output voltage of the vacuum tube voltmeter 150 is sensed by the cathode follower stage 151. In a similar manner the signal from amplifier tube 39a is applied to a similar vacuum tube voltmeter 150a whose output is sensed by a cathode follower stage 151a.

In operation assume that initially the multivibrator 75 has tube 39 turned on and the tube 39a turned off. The pulse detected by detector 26 will then produce in the voltmeter 150 a voltage proportional to the maximum acoustic signal amplitude of energy traveling through the various possible paths from the transducer 10 to the near detectors 26. On the next cycle of operations, tube 39a is turned on and tube 39 is turned off so that the detected signal from detector 27 produces in the voltmeter 150a a voltage proportional to the maximum amplitude of an acoustic signal traveling from the transducer 10 to the far detector 27. If the distance between transducer 10 and the near detector 26 is large compared to the distance between transducers 26 and 27, the difference in the voltages produced in the voltmeters 150 and 150a will be more nearly a direct measure of the attenuation of the formations than will be obtained using a single transducer and detector.

The voltages sensed by cathode followers 151 and 151a are recorded by recorder 60b in the same manner as illustrated in the system of FIG. 1. Of course the individual voltages for actuation of recorders, such as recorders 60 and 60a of FIG. 1, are available in the system of FIG. 4 if recordation thereof is desired.

It will be seen that within the provisions of the present invention periodically recurring acoustic pulses are detected at two points in the bore hole, and the signals generated upon detection are transmitted on alternate cycles to the earth's surface. Timing markers produced coincident with the generation of the acoustic pulses are utilized at the surface for selectively actuating the surface sensing systems to produce a pair of output voltages which may be utilized in the production of useful acoustic logs.

While in FIG. 1 three recorders have been shown, it will be apparent that all traces may be recorded in a single recording unit or that a selected pair of the three traces may be produced. Further, the relay system illustrated for switching detector channels at the downhole location is merely exemplary of the types of systems that are suitable for this operation. For example, a circuit downhole similar in construction and operation to the multivibrator 75 and amplifying tubes 39 and 39a would be suitable for applying signals from detectors 26 and 27 alternately to the uphole signal channel 33. However, the relay operated system is preferred because of its simplicity and minimum power requirement.

While the invention has been illustrated and described by several modifications thereof, it will be apparent that further modifications will now suggest themselves to those skilled in the art, and it is intended to cover such modifications as fall within the scope of the appended claims.

What is claimed is:

1. In a system for logging a bore hole in which a periodically recurring transient condition is generated in formations adjacent said bore hole by transducer means in said bore hole and detected by detectors located at separate points spaced from the point of generation of said condition the improvement which comprises means for transmitting markers from said transducer means to the earth's surface in predetermined time relation to each cycle of said periodically recurring condition, a signal channel extending into said bore hole from surface terminals, means responsive to said transducer means upon generation of each said transient condition for alternately connecting said signal channel to each of said detectors, a pair of sensing means at said surface terminals, means responsive to said markers for coupling first one and then the other of said sensing means on alternate cycles of said condition to said signal channel, and recording means responsive to the outputs of said sensing means.

2. A system for sensing a condition in a bore hole which comprises transducer means in said bore hole for periodically generating a transient condition in formations adjacent said bore hole, detectors separated from one another at points spaced from said generating means, a signal channel extending along said bore hole, means responsive to said transducer means upon generation of each cycle of said transient condition for alternately connecting first one and the other of said detectors to said signal channel for transmission thereover of time separated signals dependent upon said condition at two points in said bore hole, means for transmitting markers through said bore hole in predetermined time relation to each cycle of generation of said condition and means for distinctively characterizing said markers when the first of said detectors is connected to said signal channel different from their character when the second of said detectors is so connected.

3. In a system for producing an acoustic log of a bore hole in which periodically recurring acoustic pulses are generated in formations adjacent said bore hole by a pulse source for actuation of detectors positioned at separate points spaced from the point of generation of said pulses the improvement which comprises means for transmitting time markers to the earth's surface in predetermined time relation to each of said acoustic pulses, a signal channel extending into said bore hole, means coupled to said pulse source and responsive to generation of each of said acoustic pulses for alternately connecting said signal channel first to one and then to the other of said detectors, a pair of sensing means, means responsive to said time markers for coupling first one and then the other of said sensing means on alternate pulses to said signal channel, and recording means responsive to the outputs of said sensing means.

4. A system for sensing a condition in a bore hole which comprises transducer means for periodically generating acoustic pulses in formations adjacent said bore hole, detectors separated from one another at points spaced from the point of generation of said acoustic pulses, a signal channel extending along said bore hole, means responsive to said transducer means upon generation of each of said acoustic pulses alternately to connect first one and then the other of said detectors to said signal channel for transmission thereover of time separated signals dependent upon said reception of said acoustic pulses by said detectors, means for transmitting markers through said bore hole in predetermined time relation to generation of each of said pulses, and means for distinctively characterizing said markers when the first of said detectors is connected to said signal channel different from when the second of said detectors is so connected.

5. In an acoustic well logging system in which periodically recurring acoustic pulses are generated in formations adjacent a bore hole by transducer means for actuation of detectors positioned at separate points spaced from the point of generation of said pulses the improvement which comprises means for transmitting time markers to the earth's surface in a predetermined time relation to each of said acoustic pulses, a signal channel extending into said bore hole means coupled to said transducer means and responsive to generation of each of said acoustic pulses for alternately connecting said signal channel first to one and then to the other of said detectors, a pair of sensing means at the surface of the earth, means responsive to said time markers for rendering first one and then the other of said sensing means on alternate pulses responsive to signals on said signal channel for producing in each of said sensing means a voltage dependent upon the time between generation of an acoustic pulse and reception of said pulse by both of said detectors, and means for measuring the difference in said voltages for detailed velocity examination of formations between said detectors.

6. In an acoustic well logging system in which periodically recurring acoustic pulses are generated in formations adjacent a bore hole by transducer means for actuation of detectors positioned at separate points spaced from the point of generation of said pulses the improvement which comprises means for transmitting time markers to the earth's surface in a predetermined time relation to each of said acoustic pulses, a signal channel extending into said bore hole, means coupled to said transducer means and responsive to generation of each of said acoustic pulses for alternately connecting said signal channel first to one and then to the other of said detectors, a pair of peak voltage measuring circuits at the surface of the earth, means responsive to said time markers for rendering first one and then the other of said circuits on alternate pulses responsive to the signals on said signal channel for producing in each of said circuits a voltage dependent upon the magnitudes of the acoustic pulses received by said detectors, and means for measuring the difference between said voltages for a detailed attenuation examination of the formations between said detectors.

7. A system for eliminating crossfeed effects in transmitting and utilizing time separated signals generated in response to acoustic pulses produced in formations adjacent the walls of the bore hole which comprises a pair of detectors positioned at separate points spaced from the point of generation of said pulses, a transmission channel extending from within said bore hole to the surface of the earth, a relay, means for actuating said relay in response to generation of each of said pulses for alternately connecting said transmission channel first to one and then to the other of said detectors, means for transmitting a time marker to the surface in predetermined time relation to the generation of each of said pulses, a surface system having three input circuits, means for connecting said transmission channel to two of said input circuits and for applying said time marker to the third of said input circuits, and means in said surface system for separating signals from said pair of detectors comprising means connected between said third input circuit and said two input circuits for rendering first one and then the other of said two input circuits conductive on alternate occurrences of said time marker.

8. In a bore hole logging system the combination which comprises an exploring unit including a transducer supported for movement along a bore hole, an energy source for periodically exciting said transducer to produce acoustic pulses in bore hole media adjacent thereto, a pair of acoustic detectors in said exploring unit separated one from the other at points spaced from said transducer for generation of voltages in response to said acoustic pulses, a transmission circuit extending from said unit to the earth's surface, means in circuit with said energy source for connecting first one and then the other of said detectors to said transmission circuit for producing at the earth's surface a first set of voltages comprising pulses spaced in time with alternate pulses dependent upon said acoustic pulses at said two points, means in said unit for producing in predetermined time relation to the generation of each of said acoustic pulses electrical signals repeated in time and characterized differently on alternate acoustic pulses, and means for transmitting said electrical signals to the earth's surface to produce a second voltage as a time index for identifying the components of said first set of voltages.

9. In a system for logging a bore hole the combination which comprises a transducer, an excitation circuit for said transducer including an energy source and a coil, a pair of acoustic detectors separated from one another at points spaced from said transducer for generating voltages in response to said acoustic pulses, a transmission circuit extending from within said bore hole to the earth's surface, a relay actuated by said coil for connecting at a first relay circuit first one and then the other of said detectors to said transmission circuit for transmission of signals from said detectors to the earth's surface as discrete time separated signals, means for producing an electrical pulse in predetermined time relation to each of said acoustic pulses, a second relay circuit connected to said last named means for distinctively characterizing said electrical pulses on alternate cycles of said acoustic pulses, and means for transmitting said characterized electrical pulses to the earth's surface to produce an electrical time index individually to identify said voltages.

10. In a bore system for logging a bore hole the combination which comprises a transducer, an excitation circuit for said transducer including a current source and a coil for producing a magnetic field, a pair of acoustic detectors separated from one another at points spaced from said transducer for generating voltages in response to said acoustic pulses, a transmission circuit extending from within said bore hole to the earth's surface, a relay actuated by said magnetic field for connecting in a first relay circuit first one and then the other of said detectors to said transmission circuit for producing at the earth's surface discrete time separated signals from said two detectors, a pair of sensing units at the earth's surface both connected to said transmission circuit, means for producing an electrical pulse in predetermined time relation to each of said acoustic pulses, a second relay circuit connected to said last named means for distinctively characterizing said electrical pulses on alternate cycles of said acoustic pulses, and a control circuit at the surface of the earth responsive to said characterized pulses for connecting to said transmission circuit on alternate cycles of said acoustic pulses first one and then the other of said sensing units to produce two output voltages deepndent upon said acoustic pulses at said spaced points.

11. A system for producing an acoustic log of a bore hole which comprises a transducer movably positioned in said bore hole, an energy source coupled to said transducer for periodically exciting said transducer to generate acoustic pulses in formations adjacent said bore hole, a pair of detectors separated from one another at points spaced from said transducer, a signal channel extending along said bore hole, means in circuit with said source and responsive to each energization of said transducer for alternately connecting first one and then the other of said detectors to said signal channel for transmission to the earth's surface of time separated signals dependent upon the reception of said acoustic pulses by said detectors at two points in said bore hole, a pair of sensing systems connected to said signal channel for producing a pair of output voltages, means for producing an electrical pulse in predetermined time relation with respect to each energization of said transducer, means for transmitting said electrical pulse to the earth's surface, a circuit controlling system responsive to each of said electrical pulses and connected to both of said sensing systems for energizing first one and then the other of said sensing systems in response to successive electrical pulses thereby to limit the response of one said sensing systems to but one of said detectors and the other of said sensing systems to the other of said detectors to produce two output voltages dependent upon said acoustic pulses at two points in said bore hole.

12. In a system for producing an acoustic log of a bore hole in which periodically recurring acoustic pulses are generated in formations adjacent said bore hole by a pulse source for actuation of detectors positioned at separate points spaced from the point of generation of said pulses the improvement which comprises means for transmitting time markers to the earth's surface in predetermined time relation to each of said acoustic pulses, a signal channel extending into said bore hole, means coupled to said pulse source and operative coincident with generation of each of said acoustic pulses for alternately connecting said signal channel first to one and then to the other of said detectors, a pair of sensing means, means responsive to said time markers for coupling first one and then the other of said sensing means on alternate pulses to said signal channel, and recording means responsive to the outputs of said sensing means.

13. An acoustic logging system comprising:
a logging tool adapted for suspension in a borehole by a cable from the earth's surface, said cable including electrical conductors,
a transmitter in said tool,
means for periodically energizing said transmitter for producing a succession of acoustic pulses,
a near detector and a far detector in said tool supported in a spaced-apart relation one to the other and both spaced to one side of said transmitter, each being responsive in succession to reception from adjacent borehole formations of said acoustic pulses for producing electrical signals, and circuit-controlling means disposed between said electrical conductors and said detectors for applying to said conductors upon energization of said transmitter the resultant signals from said far detector while said near detector is disconnected from said conductors to prevent the application to said conductors of the resultant signals from said near detector and upon the next energization of said transmitter for applying to said conductors the resultant signals from said near detector while said far detector is disconnected from said conductors to prevent the application thereto of the resultant signals from said far detector until after the next energization of said transmitter.

14. An acoustic logging system comprising:
a logging tool adapted for suspension in a borehole by a cable from the earth's surface, said cable including electrical conductors,
a transmitter in said tool,
means for periodically energizing said transmitter for producing a succession of acoustic pulses,
a near detector and a far detector in said tool supported in spaced-apart relation one to the other and both spaced to one side of said transmitter, one of which detectors is disconnected from said conductors, each said detector being responsive to reception from adjacent borehole formations of said acoustic pulses for producing electrical signals, and
circuit-controlling means disposed between said conductors and said detectors for disconnecting from said conductors one of said detectors before arrival at said detector of an acoustic pulse from said transmitter and for connecting another of said detectors to said conductors before arrival at said last-named detector of the acoustic pulse from said transmitter.

15. An acoustic logging system comprising:
a logging tool adapted for suspension in a borehole by a cable from the earth's surface, said cable including electrical conductors,
a transmitter in said tool,
means for periodically energizing said transmitter for producing a succession of acoustic pulses,
a near detector and a far detector in said tool supported in spaced-apart relation one to the other and both spaced to one side of said transmitter, each being responsive in succession to reception from adjacent borehole formations of said acoustic pulses for producing electrical signals, and
circuit-controlling means disposed between said detectors and said conductors for completing a connection from one of said detectors to said conductors and at the same time disconnecting the other of said detectors from said conductors,
said connection and disconnection taking place before arrival of the acoustic pulse at either of said detectors for disconnecting the one and connecting the other of said detectors to said conductors.

References Cited by the Examiner
UNITED STATES PATENTS

| | | | |
|---|---|---|---|
| 2,088,588 | 8/37 | Dudley | 181—.53 |
| 2,190,686 | 2/40 | Slichter | 181—.53 X |
| 2,200,476 | 5/40 | Mounce | 181—.53 |
| 2,275,736 | 3/42 | Cloud | 181—.53 |

BENJAMIN A. BORCHELT, *Primary Examiner.*

SAMUEL FEINBERG, MILTON BUCHLER, ISAAC LIZANN, BENNETT G. MILLER, SAMUEL BERNSTEIN, *Examiners.*